(12) United States Patent  
Lopez et al.

(10) Patent No.: US 8,098,070 B2  
(45) Date of Patent: Jan. 17, 2012

(54) ELECTROMAGNETIC SUBTERRANEAN IMAGING INSTRUMENT

(76) Inventors: John A. Lopez, Dixon, CA (US); Ingo Cyliax, Woodland, CA (US); Michael Caisse, Cameron Park, CA (US); Darrell R. Word, Leander, TX (US); Rod Sorenson, Elk Grove, CA (US)

( * ) Notice: Subject to any disclaimer, the term of this patent is extended or adjusted under 35 U.S.C. 154(b) by 501 days.

(21) Appl. No.: 12/220,617

(22) Filed: Jul. 24, 2008

(65) Prior Publication Data

US 2009/0302850 A1 Dec. 10, 2009

Related U.S. Application Data

(60) Provisional application No. 61/131,229, filed on Jun. 5, 2008.

(51) Int. Cl.
*G01V 3/00* (2006.01)

(52) U.S. Cl. ........................................................ 324/337

(58) Field of Classification Search ........................ None
See application file for complete search history.

(56) References Cited

U.S. PATENT DOCUMENTS

| | | | |
|---|---|---|---|
| 2,066,135 A | 12/1936 | Barret | |
| 2,066,561 A | 1/1937 | Fisher | |
| 4,818,944 A | 4/1989 | Rippingale | |
| 4,998,610 A * | 3/1991 | Said et al. | 73/163 |
| 5,578,926 A | 11/1996 | Reinhardt | |
| 5,650,725 A | 7/1997 | Powell et al. | |
| 5,654,637 A | 8/1997 | McNeill | |
| 5,770,944 A | 6/1998 | Ebinger et al. | |
| 5,939,885 A | 8/1999 | McClure | |
| 6,084,403 A * | 7/2000 | Sinclair et al. | 324/221 |
| 6,714,153 B1 | 3/2004 | Kong | |
| 2004/0107070 A1* | 6/2004 | Anderson et al. | 702/150 |
| 2005/0264295 A1 | 12/2005 | Strack | |

FOREIGN PATENT DOCUMENTS

| | | |
|---|---|---|
| EP | 1057047 | 8/2008 |
| GB | 1443925 | 7/1976 |

* cited by examiner

*Primary Examiner* — Jermele M Hollington
(74) *Attorney, Agent, or Firm* — Heisler & Associates

(57) ABSTRACT

The instrument utilizes at least one electromagnetic signal transmitter and at least one electromagnetic signal receiver with the receiver detecting a receiver signal responsive to the transmitter signal and indicative of subterranean details adjacent to the instrument. The instrument is attachable to a tow vehicle for transport and includes a GPS antenna and tags data gathered by the instrument with GPS position information. The instrument is formed in modular sections which can be removably attached for collapsing into a smaller space and to allow for flexible configuration of the instrument in various different ways. A wheeled carriage is provided to carry the instrument over the ground. Antennas for the transmitter and receiver, as well as circuitry and cooling systems are all provided to supply the instrument with high resolution and a clear signal indicative of the position and characteristics of subterranean details of interest.

21 Claims, 9 Drawing Sheets

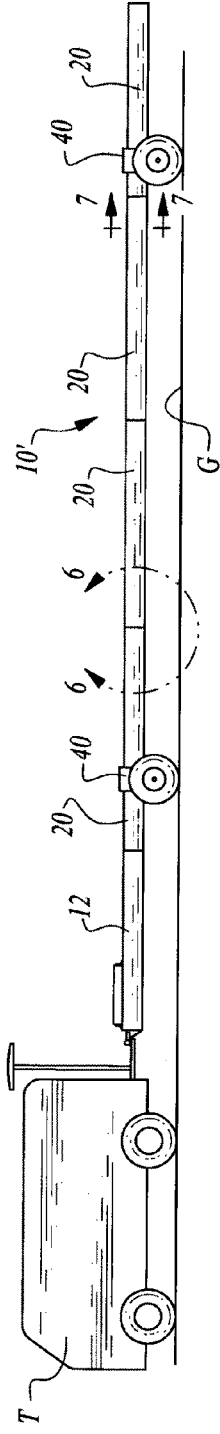
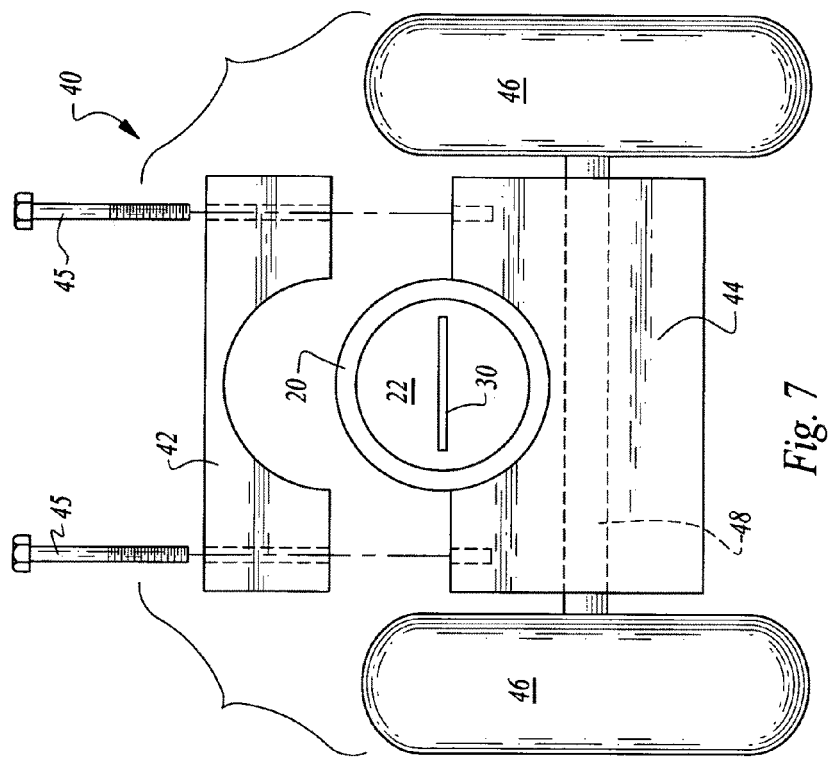
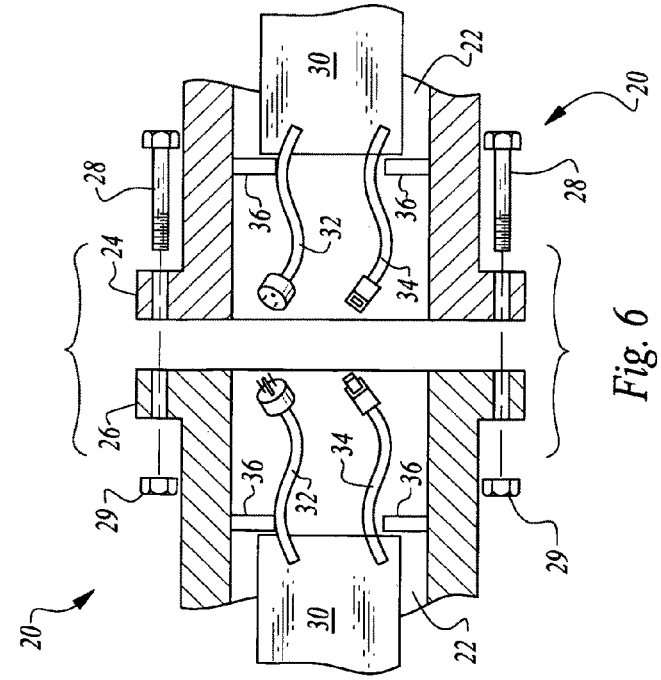
Fig. 5
Fig. 7
Fig. 6

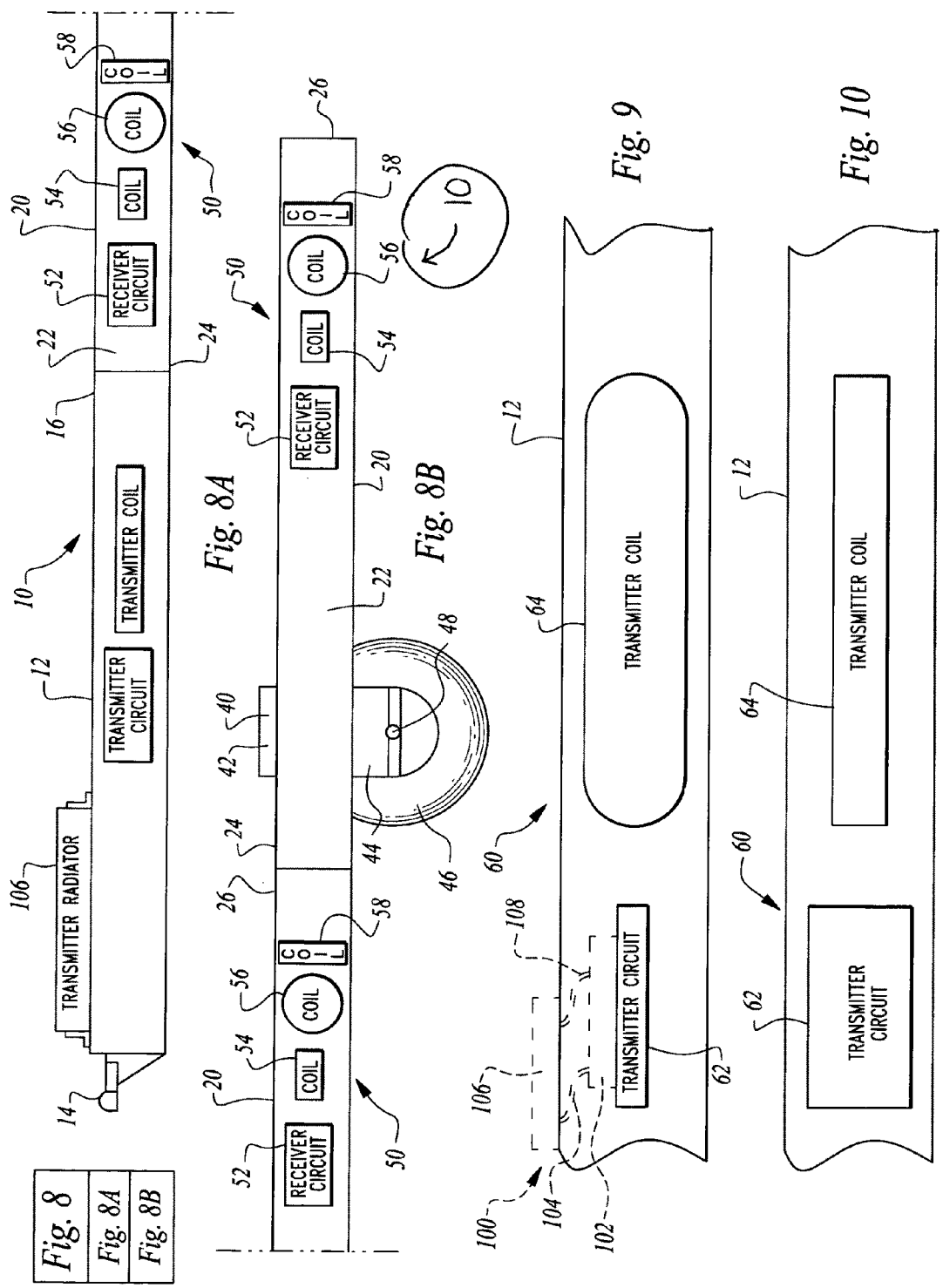

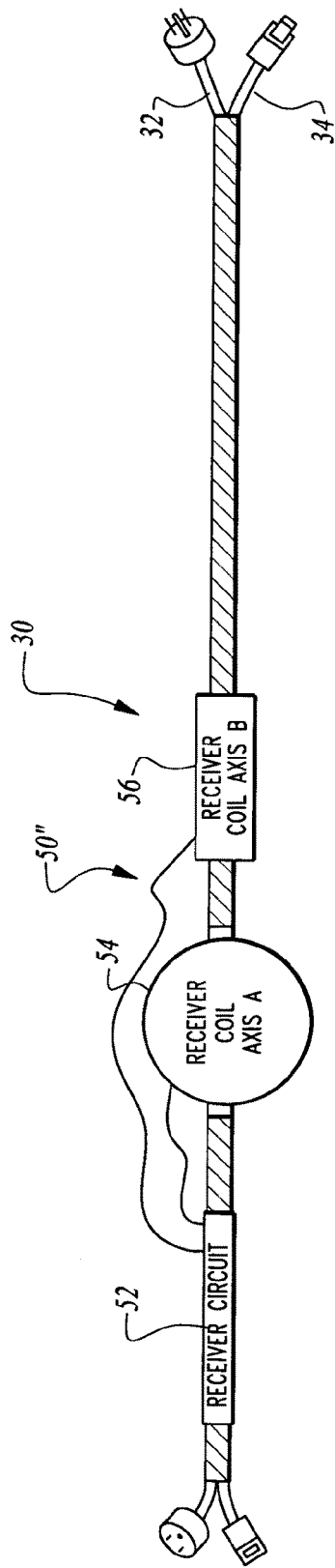
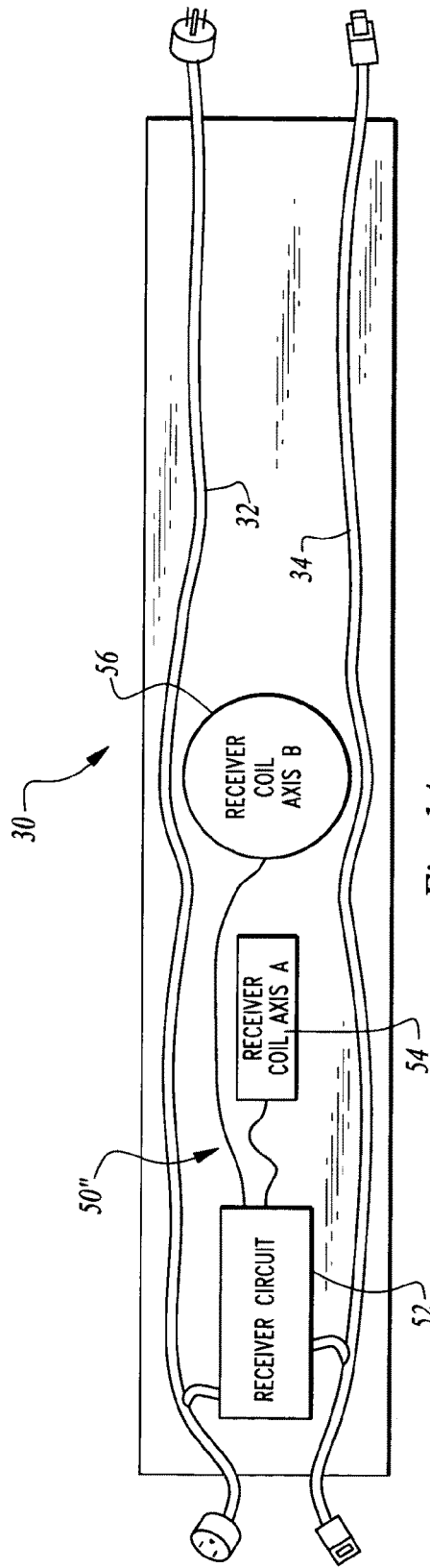
Fig. 13
Fig. 14

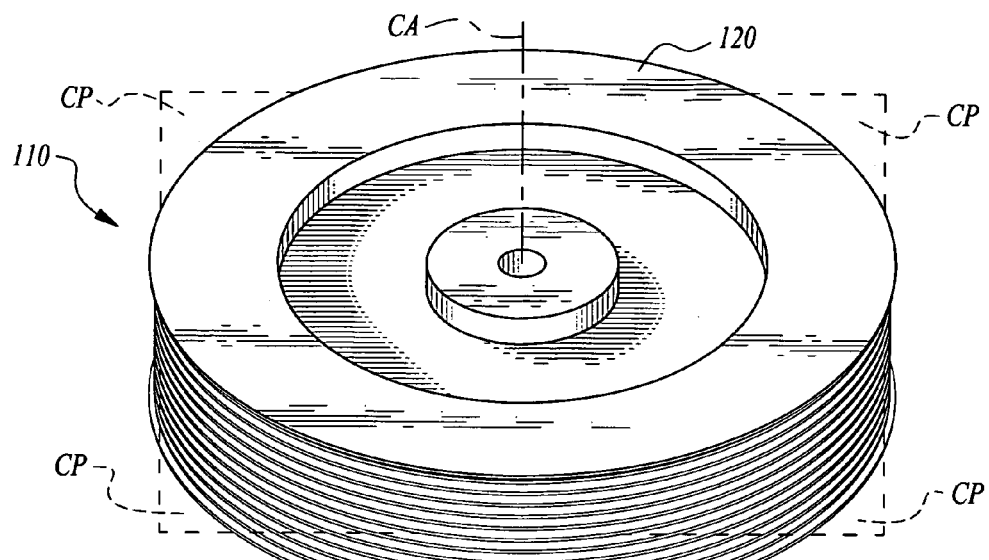
Fig. 21
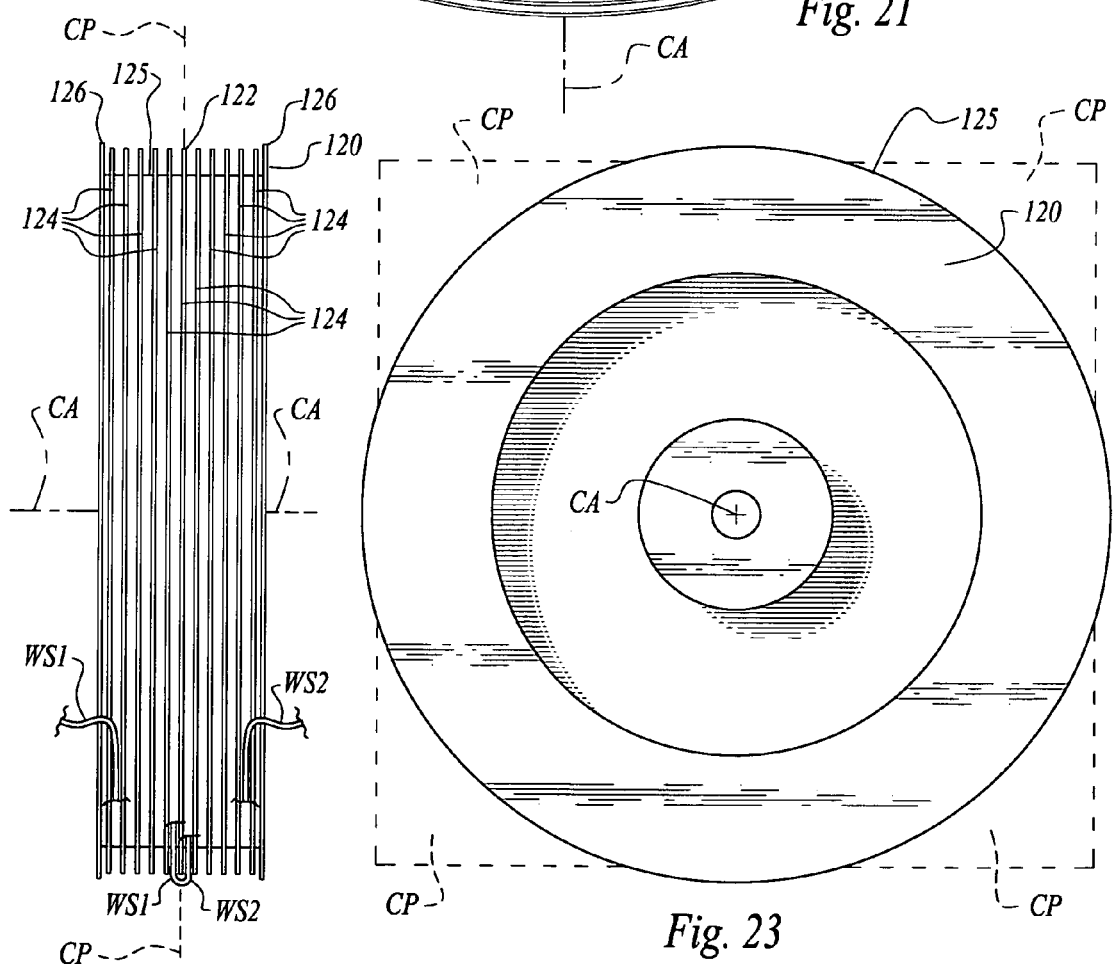
Fig. 22
Fig. 23

ELECTROMAGNETIC SUBTERRANEAN IMAGING INSTRUMENT

CROSS-REFERENCE TO RELATED APPLICATIONS

This application claims benefit under Title 35, United States Code §119(e) of U.S. Provisional Application No. 61/131,229 filed on Jun. 5, 2008.

GOVERNMENT LICENSE RIGHTS

The U.S. Government has a paid-up license in this invention and the right in limited circumstances to require the patent owner to license others on reasonable terms as provided for by the terms of Contract No. W912HZ-07-C-0056 awarded by the U.S. Army.

FIELD OF THE INVENTION

The following invention relates to instruments for use in imaging subterranean regions through utilization of an electromagnetic signal transmitter and receiver. More particularly, this invention relates to such imaging instruments which are ground mobile and which can operate while in motion and be configured in a variety of different ways while exhibiting a high degree of sensitivity. Data from such an instrument may be tagged, such as with GPS position data to allow the instruments to survey a defined subterranean space.

BACKGROUND OF THE INVENTION

The ability of electromagnetic fields to extend to varying degrees through solid material makes possible the use of electromagnetic field generators and sensors for imaging of subterranean spaces. Instruments have been developed over time to take advantage of this ability of electromagnetic fields to penetrate solid objects. For instance, classic metal detectors generate an electromagnetic field and sense distortions in that electromagnetic field associated with varying conductivities and other characteristics of objects beneath or upon the surface of the ground or other objects.

Various different portions of the electromagnetic spectrum are useful for imaging different depths within soil. Modulating electromagnetic fields at various frequencies can achieve this multiple depth functionality. It is well known that low frequency electromagnetic signals can travel more deeply through solid structures, with at least a portion of the transmitted signal being detected at the surface and providing some indication of conditions deep within the soil. Such low frequency prospecting systems are used in oil exploration and other deep resource identification. High frequency signals (e.g. in the kHz range or higher) have the benefit of providing more specific information about subterranean objects. However, high frequency signals are readily absorbed by soil leaving little of the signal remaining for analysis. If objects or features to be found are too deep, such high frequency systems have proven generally ineffective. Thus, a significant need has existed for instruments which can provide a high degree of sensitivity to small changes in subterranean characteristics with enough of the signal surviving to be detected and return valuable information to the operator.

One technique which has shown some success is to transmit a frequency domain electromagnetic signal above and near the surface of the ground and sense a response to this signal in the form of a phase shift in the originally transmitted signal by a receiver located a fixed distance away from the transmitter. One such instrument is described in U.S. Pat. No. 5,654,637. While this instrument is effective in imaging underground anomalies it suffers from numerous drawbacks. The instrument is only portable in a very crude sense in that it can be picked up and hand carried. The practical survey range of such an instrument is therefore limited. Furthermore, its power levels are limited, such that only objects relatively close to the surface can be imaged with any degree of effectiveness. Also, such instruments are prone to saturation in high soil conductance environments and other high noise environments.

Increasing power to an electromagnetic signal transmitter is not merely a matter of increasing power to the transmitter. Rather, the signal generated by the transmitter must be carefully amplified in a manner which factors in details of the coil antenna and details of the associated transmitter circuitry. Furthermore, coil antennas are susceptible to self-capacitance, especially when operated at high power levels, such that the coil antenna increases in self-capacitance as the power level is increased and little or no real net benefit is realized by merely increasing the power to the transmitter antenna. Such difficulties, as well as high weight and bulk have kept the state of the art from advancing and limited the effectiveness of such subterranean imaging instruments.

The lack of portability and rates of data collection in prior art instruments have prevented effective utilization of subterranean imaging systems in the prior art for large subterranean area surveys. In addition, prior art instruments have a great tendency to saturate in high conductivity soil conditions and lack sufficient sensitivity in low conductivity soil conditions. Thus, small but significant values are not detected by such prior art instruments. Accordingly, a need exists for an instrument which can be made readily portable, ground mobile and gather data at a sufficiently fast rate to allow the instrument to be transported rapidly over the surface and gather highly detailed data, even for small details over a large area, as an area surveying tool.

SUMMARY OF THE INVENTION

To satisfy these and other objectives, a subterranean imaging instrument is provided which provides a platform having at least one transmitter and at least one receiver. The transmitter is configured so that it can emit an electromagnetic signal from a transmitter coil antenna. At least one receiver is provided, preferably a fixed distance away from the transmitter. The receiver includes a receiver coil antenna which detects a signal responsive to the transmitter signal and which exhibits a phase shift and quadrature, including both real and imaginary components in the signal, relative to the transmitter signal, corresponding to apparent conductivity and magnetic susceptibility of the soil and other distinctive subterranean composition characteristics, and indicative of features and objects of interest beneath the surface.

In one form of the invention, the receivers are at least partially contained within modular enclosure segments coupled to the transmitter which allow for removable attachability of the receivers to the transmitter, such as for collapsibility when not in use and for transportation, and to facilitate expandability of the platform to have more than one receiver and a variety of different positions of the receivers away from the transmitter. The segments can be detached and reattached with receiver-to-transmitter spacing remaining constant for repeatability of surveys.

Such a modular system can also optionally include a carrier, such as a wheeled carrier, a pontoon carrier, a sled carrier or a ski carrier. The entire platform can be configured to be attached to a tow vehicle, such as through a hitch for transportation of the instrument over a survey area. Data gathering rates are sufficiently fast (e.g. 156.25 samples per second) that the tow vehicle can tow the instrument at highway speeds (e.g. 55 MPG) and still obtain a data point every six inches.

In a second aspect of the invention, the transmitter and receiver are configured to exhibit higher sensitivity through high power by fitting the transmitter circuitry driving the transmitter coil antenna with a cooling system. The cooling system is preferably configured to exchange heat with a surrounding atmosphere efficiently as the platform is passed through the air while being towed by the tow vehicle so that efficiency of transmitter circuitry and high performance characteristics of transmitter circuitry can be augmented by the advantages associated with the transmitter circuitry moving through the air while being towed by the tow vehicle. This high sensitivity is further augmented by providing the transmitter coil antenna with a relatively high magnetic dipole moment, such as greater than one amp meter squared, and configuring the coil antenna to have low self-capacitance, such as by segmenting the transmitter coil antenna into separate segments with low conductivity dividers therebetween.

In a third aspect of the invention, at least one receiver receives and digitizes the phase shift data and tags this data with a temporal tag, such as a time tag, a GPS position tag or both. The data can thus be manipulated while maintaining position information so that the data can be combined together in a variety of different ways for meaningful output to a user. Portions of this data can be utilized by a tow vehicle operator so that the tow vehicle operator knows where the tow vehicle currently is and the path that it has followed. A data transmitter or other signal path is preferably provided to a remote location where another operator can be studying phase shift magnitude data along with GPS positioning data to analyze the survey results as they are being gathered and potentially communicate with the tow vehicle operator to further enhance the quality of data being gathered.

In a fourth aspect of the invention, the instrument has power and frequency levels which can be changed either by the operator or in an automatic fashion while the survey is in process. The instrument typically operates at a constant power level and a constant frequency. If the instrument detects an object of interest, either by visual inspection of an operator or through comparison to a database of geophysical condition of potential objects of interest, the instrument then cycles through different power and/or frequency levels until a power and/or frequency setting is found which causes the object or geophysical condition to exhibit the greatest contrast to background noise. This adjusted power and frequency level is then utilized for further surveying of the object or geophysical condition until the vehicle has passed the object or geophysical condition sufficiently that the instrument can return to original power and frequency settings for further surveying of a subterranean region.

In a fifth aspect of the invention, the receiver antennas are in the form of receiver coils which are wound in a manner which is mirrored on either side of a central divider of the coil with leads at each end of the coil routed to inputs of a differential amplifier and outputs of the differential amplifier are routed to an analog to digital converter for digitization of an analog differential signal outputted from the differential amplifier. Such a configuration eliminates common mode noise by having common mode noise cancel out when focusing on differentials sensed between the two leads of the antenna.

In a sixth aspect of the invention, the coil antenna differential signals from the differential amplifier are routed to an analog-to-digital converter with twenty-four bits or more, further allows for sensing of exceptionally small details in the signal. High dynamic range for the instrument, meaningful measurement of a wide variety of responses whether due to soil characteristics or other targets of interest (e.g. toxic plumes, explosive devices, pipes or other subterranean details).

OBJECTS OF THE INVENTION

Accordingly, a primary object of the present invention is to provide an instrument for imaging a subterranean space which exhibits high sensitivity and high dynamic range.

Another object of the present invention is to provide an instrument for imaging a subterranean space that exhibits high power.

Another object of the present invention is to provide an instrument for imaging a subterranean space that is time stamped and/or tagged with position specific data, such as data provided by a GPS.

Another object of the present invention is to provide an instrument for imaging a subterranean space that exhibits high efficiency in terms of power with a high magnetic dipole moment and a relatively low self-capacitance.

Another object of the present invention is to provide a subterranean electromagnetic imaging instrument which has multiple receivers which are contained within modular housing enclosures which can be attached together and to the transmitter in a variety of different ways to configure the instrument as desired.

Another object of the present invention is to provide an electromagnetic subterranean imaging system which is mobile by being towed behind a tow vehicle.

Another object of the present invention is to provide a subterranean imaging instrument which can effectively detect changes in apparent conductivity and magnetic susceptibility of the soil and other subterranean conditions or objects, and in doing so voids in a subsurface area, underground waterways, common or precious metals (included identification), archeological artifacts, improvised explosive devices, land mines, varied munitions, varied contraband, varied stolen property, tunnels, defects in foundations, levees or other engineering structures, and otherwise imaging subterranean details with high resolution.

Another object of the present invention is to provide a portable subterranean imaging instrument which can be towed over surfaces with different characteristics by removably attaching wheels, skids, skis, pontoons or other carriage support structures to the instrument.

Another object of the present invention is to provide a portable subterranean imaging instrument which can gather data at a high rate to facilitate operation at highway speeds with data points spaced less than one foot apart.

Another object of the present invention is to provide an instrument with multiple receivers and control over which receivers are operational or off during a survey.

Another object of the present invention is to provide an instrument with high dynamic range and capable of sensing extremely tiny signals without saturation or loss of sensitivity so that meaningful readings of small differences indicative of subterranean details can be gathered and studied.

Another object of the present invention is to provide an instrument which can adjust power and/or frequency levels in real time to adjust for soil conductivity or other conditions which can result in more meaningful sensed data if adjusted.

Another object of the present invention is to provide an instrument which can send real time data to a remote location for analysis and/or manipulation or storage at a separate location via a remote data link.

Other further objects of the present invention will become apparent from a careful reading of the included drawing figures, the claims and detailed description of the invention.

BRIEF DESCRIPTION OF THE DRAWINGS

FIG. 5 is a side elevation view similar to that which is shown in FIG. 2 but for a modified embodiment of the invention with a large number of modular housing enclosure segments coupled to a single tow vehicle and illustrating an embodiment using multiple wheeled carriages.

FIG. 6 is a detail of a portion of that which is shown in FIG. 5, illustrating how the separate modular enclosure sections can be coupled together in one embodiment.

FIG. 7 is a sectional view taken along lines 7-7 of FIG. 5 illustrating how a wheeled carriage might attach to the platform in one embodiment.

FIG. 8 is a side elevation view of the platform of this invention and illustrating an embodiment with one transmitter and three receivers over the ground.

FIG. 9 is a top plan view of the transmitter coil portion of the instrument of this invention.

FIG. 10 is a side elevation view of that which is shown in FIG. 9.

FIG. 13 is a top plan view similar to that which is shown in FIG. 11 but in a two receiver antenna coil embodiment with the receiver antenna coils mutually perpendicular to each other.

FIG. 14 is a side elevation view of that which is shown in FIG. 13.

FIG. 21 is a perspective view of a receiver coil according to a preferred embodiment.

FIG. 22 is a front elevation view of that which is shown in FIG. 21.

FIG. 23 is a side elevation view of that which is shown in FIG. 21.

DESCRIPTION OF THE PREFERRED EMBODIMENT

Figure 1:
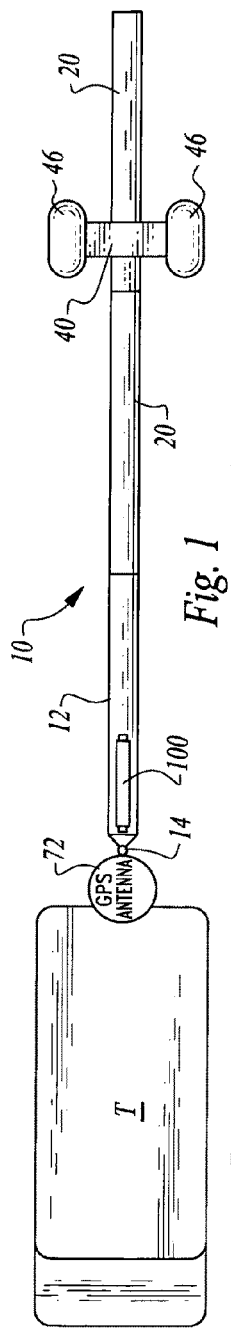
FIG. 1 is a top plan view of the platform containing the instrument of this invention and being towed by a tow vehicle.
Figure 2:
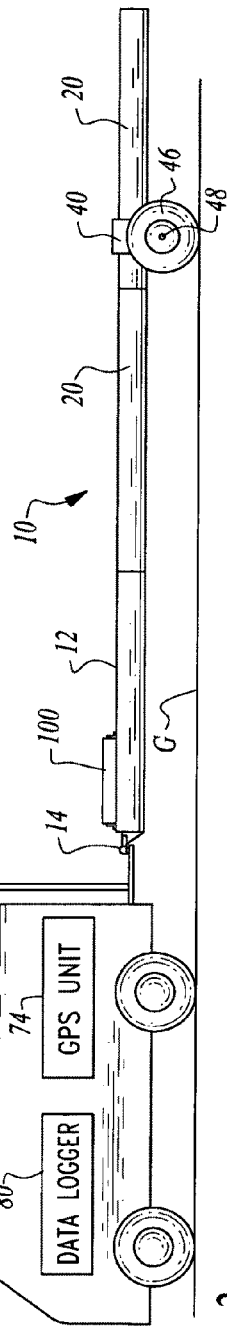
FIG. 2 is a side elevation view of that which is shown in FIG. 1.
Figure 3:
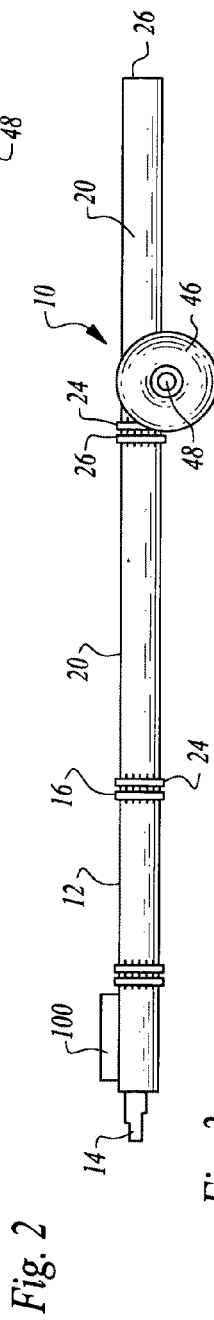
FIG. 3 is a side elevation view of the platform containing the instrument of this invention shown without the tow vehicle.
Figure 4:
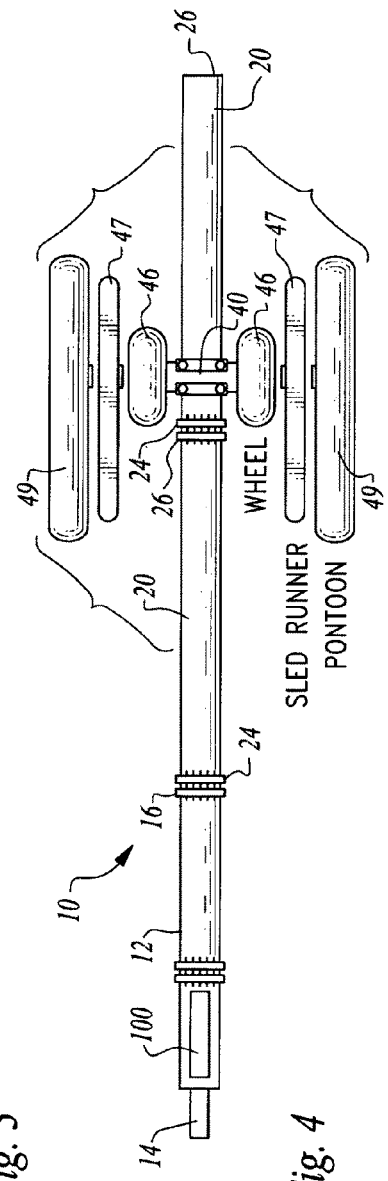
FIG. 4 is a top plan view of that which is shown in FIG. 3 and further illustrating a variety of different carriage support elements for carrying the platform over an underlying surface.
Figure 11:
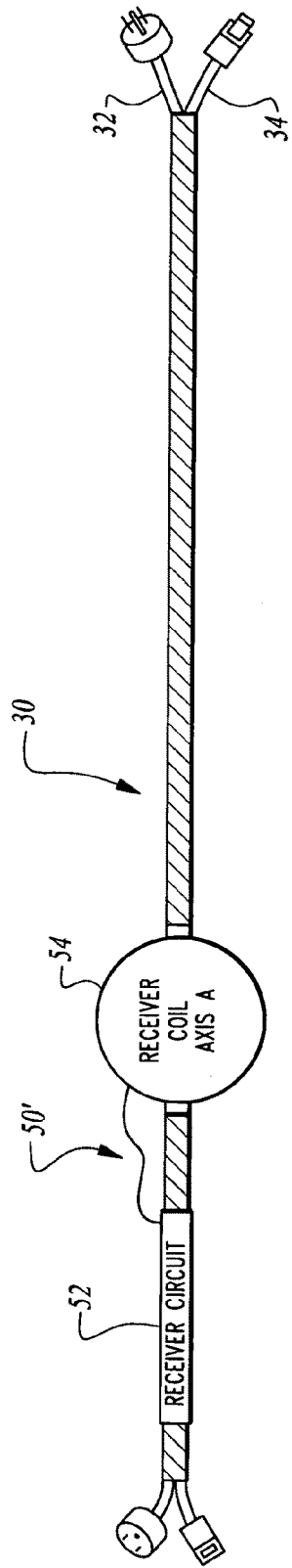
FIG. 11 is a top plan view of the receiver segment portion of the instrument of this invention with a single coil antenna.
Figure 12:
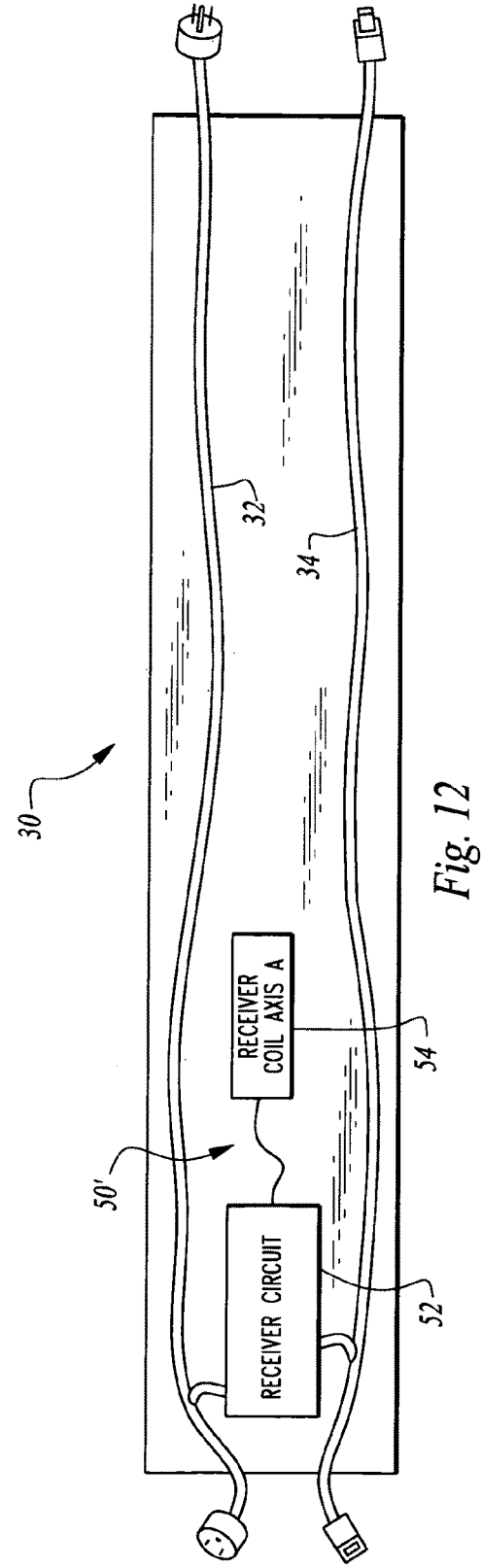
FIG. 12 is a side elevation view of that which is shown in FIG. 11.
Figure 15:
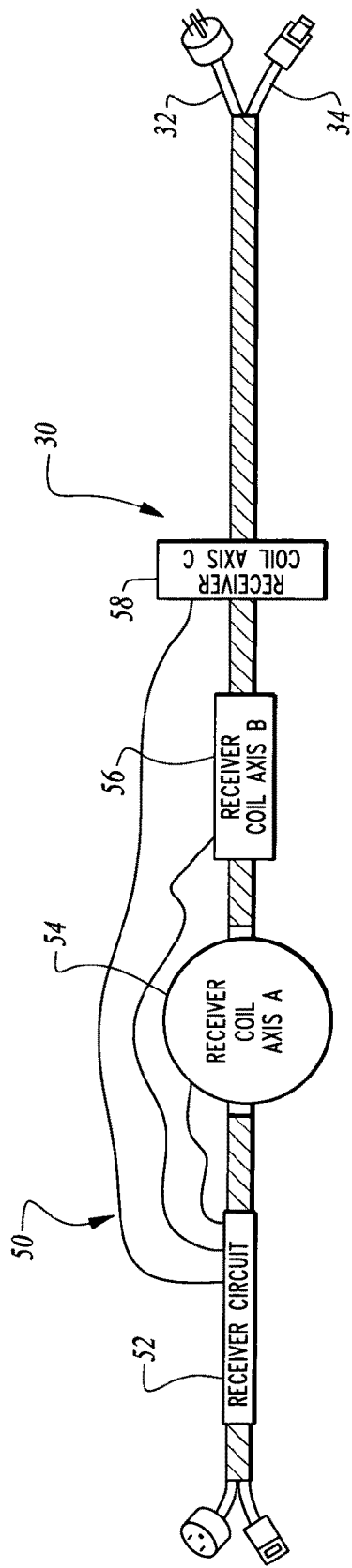
FIG. 15 is a top plan view similar to that which is shown in FIG. 11 but for a three receiver antenna coil embodiment, with each of the receiver antenna coils mutually perpendicular to each other.
Figure 16:
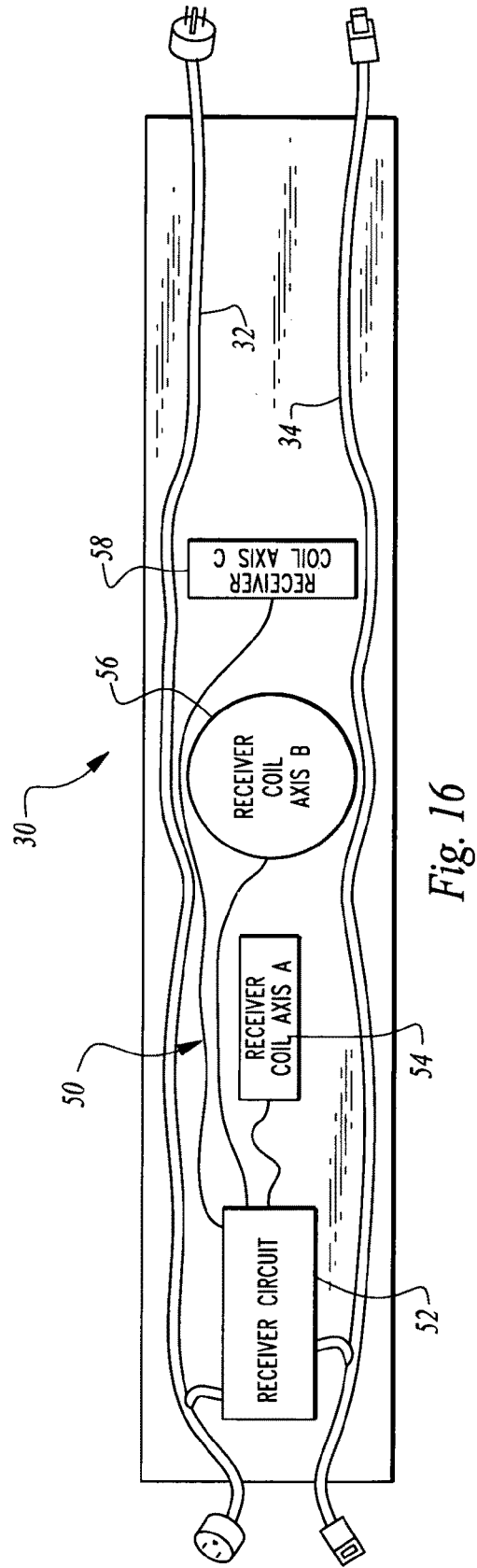
FIG. 16 is a side elevation view of that which is shown in FIG. 15.

Referring to the drawings, wherein like reference numerals represent like parts throughout the various drawing figures, reference numeral 10 is directed to an instrument for electromagnetic imaging of a subterranean space. The instrument 10 is provided within a mobile platform adapted to be towed by a tow vehicle T over ground G (FIGS. 1 and 2). The instrument 10 generally includes at least one transmitter assembly 60 emitting an electromagnetic signal from a transmitter coil antenna 64 (FIG. 9). The instrument 10 also includes at least one receiver assembly 50 with at least one coil antenna 54 (FIG. 11) thereon, and potentially multiple mutually perpendicular antennas and potentially multiple receivers 50. The receivers 50 receive a signal corresponding with a phase shift relative to the transmitter 60 signal indicative of subterranean details beneath the instrument 10. GPS data is gathered and position and phase shift data is tagged with time and/or GPS data so that the signal can be constructed into a frame of reference which is meaningful to an analyst of the information gathered by the instrument, such as terrestrial surface position coordinates. The instrument 10 is configured to be readily transportable behind the tow vehicle T and highly mobile so that a survey of an area can be performed rapidly and reliably.

In essence, and with particular reference to FIG. 8, basic details of the instrument 10 are described, according to a preferred embodiment. The instrument 10 includes a transmitter tube 12 in which the transmitter is mounted and a plurality of tube segments 20 which can attach in a modular fashion to the transmitter tube 12. The tube segments 20 and transmitter tube 12 attach together along a linear longitudinal axis. The tube segments 20 can be empty or contain one or two (or potentially more) receiver assemblies 50 therein. Carriers 30 are provided which fit within the tube segments 20. These carriers 30 carry equipment such as the receiver assemblies 50 thereon or potentially transmitter assemblies 60 (FIG. 9). A carriage 40 is removably attachable to one of the tube segments 20. The carriage 40 can include wheels 46 to allow the instrument 10 to be rolled over an underlying surface potentially at a high rate of speed for rapid data acquisition (e.g. 156.25 samples per second to take a data point every 6.2 inches at 55 MPH).

The transmitter antenna 64 of the transmitter assembly 60 and receiver antennas 54, 56, 58 of the receiver assemblies 50 are spaced a fixed distance away from each other for data collection that is controlled to match the desires of an operator. A GPS system supplies position data to a data logger 80 which also receives phase shift data from the receiver assemblies 50. The data can thus be compiled in a manner meaningful to an analyst. A graphical user interface 90 is supplied to provide relevant information to an operator of the tow vehicle T, such as a path traveled so far by the instrument over an area map.

A transmitter cooling assembly 100 is associated with the transmitter tube 12 and heat transfer away from transmitter circuitry to optimize performance of the transmitter circuitry.

Coils of the antennas are optimized to minimize self-capacitance and wound to facilitate sampling in a differential fashion.

More specifically, and with continuing reference to FIG. 8 as well as FIGS. 9 and 10, details of the transmitter tube 12 and associated transmitter assembly 60 are described. In this embodiment, the transmitter tube 12 is provided closest to the tow vehicle T. The transmitter tube 12 includes a hollow core and is preferably circular in cross-section such that the transmitter tube 12 is cylindrical in form. The transmitter tube 12 could have any other geometry but is preferably generally elongate in form to provide a low profile and lightweight structure that still provides significant spacing between a transmitter coil antenna 64 within the transmitter tube 12 and receiver coil antennas 54, 56, 58 within receiver assemblies 50 associated with tube segments 20 trailing behind the transmitter tube 12.

The transmitter tube 12 preferably includes a hitch 14 or other means of attachment at one end thereof. The hitch 14 is adapted to allow attachment of the transmitter tube 12 to the tow vehicle T. A rear end 16 is provided opposite the hitch 14. The rear end 16 is preferably circular in form and includes a flange similar in form to flanges on the tube segments 20 to readily facilitate attachment of the tube segments 20 to the rear end 16 of the transmitter tube 12, preferably using a similar attachment method that can be utilized for attachment of adjacent tube segments 20.

In such a configuration, the transmitter tube 12 is slightly different from the other tube segments 20 but works modularly along with the tube segments 20. Such modularity allows the transmitter tube 12 and tube segments 20 to be broken down into separate parts such as for storage or transport to different locations where surveys are to take place. The instrument can then be reliably configured by attaching the transmitter tube 12 to the various different tube segments 20 to configure the instrument 10 as desired. The transmitter tube 12 is preferably formed of a non-conductive material to avoid interference for the transmitter within the transmitter tube 12 and interference with the various receivers of the instrument 10.

The transmitter assembly 60 is preferably contained within the transmitter tube 12. This transmitter assembly 60 can be mounted upon one of the carriers 30 or separately mounted within the transmitter tube 12. The transmitter assembly 60 includes a circuit 62 and a coil antenna 64. The circuit 62 receives power from a power supply, such as contained on the tow vehicle T, and also can receive signal details, such as a particular frequency for a transmitter signal to be transmitted by the transmitter assembly 60. In addition to frequency, the-circuit 62 can also control the power of the signal.

Figure 17:
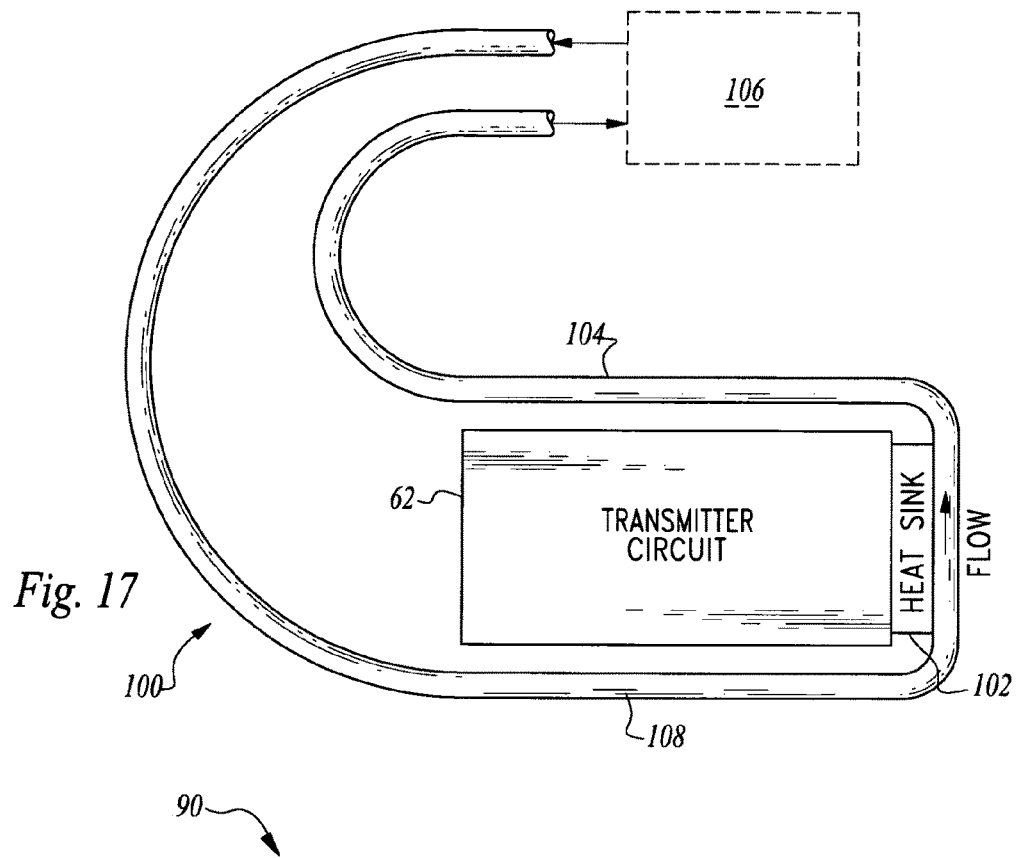
FIG. 17 is a schematic representation of a cooling system for the transmitter circuit of the instrument of this invention.

Preferably, this circuit 62 is coupled to the transmitter cooling assembly 100 such as by mounting a heat sink 102 directly adjacent the circuit 62. This heat sink 102 (FIG. 17) can have a fluid path adjacent thereto which passes a heat transfer fluid past the heat sink 102, along a hot path 104, to a radiator 106 where heat is removed. A cool path 108 can route back from the radiator 106 to the heat sink 102 so that the cool path 108 and hot path 104 form a complete circuit with the heat sink 102 at one end thereof and a radiator 106 at the other end thereof (FIG. 17).

The radiator 106 is beneficially located on an outer surface of the transmitter tube 12. Preferably, this position is on top of the transmitter tube 12 where airflow over the radiator 106 can occur with a minimum of interference. The radiator 106 preferably includes fins to augment operation of the radiator. Preferably, these fins are oriented to maximize heat transfer therefrom to surrounding air when the instrument 10 is being towed by the tow vehicle T in a direction substantially aligned with a long axis of the transmitter tube 12. One- such configuration is to have the fins on the radiator 106 extending longitudinally. Another configuration is for the fins to extend radially from the radiator 106 and radially from the long axis of the transmitter tube 12 (as depicted in FIG. 17).

The transmitter tube 12 provides the basic function of protecting the transmitter contained therein from damage to keep the transmitter functioning properly, and also to provide structural support and preferably as highly rigid coupling and position control between the transmitter and receivers in tube segments 20 attached to the transmitter tube 12. The transmitter tube 12 preferably has a diameter similar to that of the tube segments 20 and a similar cross-sectional form.

With particular reference to FIGS. 1-6, details of the tube segments 20 and associated carriers 30 are described. The tube segments 20 preferably are each of similar length and similar diameter so that the tube segments 20 are essentially interchangeable. Each tube segment 20 includes a hollow core 22 which can contain receiver assemblies on carriers 30, or can conceivably remain empty. Each tube segment 20 has a leading end 24 opposite a trailing end 26. The tube segments 20 are preferably cylindrical in form. Bolts 28 can be utilized (along with nuts 29) to couple a leading end 24 of one tube segment 20 to a trailing end 26 of another tube segment 20 so that tube segments 20 can be oriented along a longitudinal axis of the instrument 10, trailing behind the transmitter tube 12 for positioning receivers at desired distances away from the transmitter within the transmitter tube 12.

While the tube segments 20 are preferably substantially just plane cylinders with flanges at ends thereof or other fastener equipment at ends thereof to facilitate fastening of tube segments 20 together, the tube segments 20 could additionally include structures for registering of carriers 30 at precise positions within each tube segment 20 and/or for precise positioning of a carriage 40 on an exterior of the tube segments 20 for carrying of the tube segments 20 over an underlying surface. The tube segments 20 thus provide a preferred form of modular housing enclosure segments for containing various different components (or remaining empty) as part of the instrument 10.

The flanges that receive the bolts 28 provide merely one form of a means to couple adjacent tube segments 20 together. As an alternative, the tube segments 20 could be flanged, but rather than utilizing bolts extending longitudinally through the flanges, a clamp could be provided which grips the flanges and pulls them together. A series of such clamps could be utilized to couple the two tube segments 20 together. As another alternative, a clamp could extend circumferentially about the two flanges with the clamp hinging at one end to close over the flanges with two halves and have a trough inside the clamp halves which receives the flanges and pulls the flanges together. A clasp opposite the hinge on such a clamp could include a toggle for secure tightening of such a clamp. As another alternative, a threaded coupling could be provided on one of the ends of the tube segment 20 with the other tube segment having a threaded end. The threaded coupling would be threaded onto the threaded end of an adjacent tube segment so that rotation of the threaded coupling would draw the two tube segments tightly together. Beneficially, regardless of the coupling methodology utilized, the tube segments 20 can be secured together without substantial motion therebetween when attached. By maintaining a rigidity of the separate tube segments, a distance between receivers and the transmitter can remain substantially constant to avoid any distance change distorting data obtained by the instrument.

Each carrier 30 preferably fits within a tube segment 20 and has a length similar to that of a tube segment 20. The carriers 30 include connection details for connecting receivers and transmitters together within the instrument 10. Most preferably, each carrier 30 includes two lines including a power line 32 and a signal line 34. At ends of the carriers 30 couplings are provided for coupling together the power lines 32 of individual carriers 30 within individual tube segments 20. The power lines 32 supply power to the receiver assemblies or other structures within tube segments 20 of the instrument 10.

A signal line 34 is provided, which could optionally conceivably be encoded upon a power signal running on the power line 32. The signal line carries a signal from each receiver assembly back to a data logger or other data processing server. Carriers 30 are shown in this embodiment as planar sheets nested within the tube segments 20. Most preferably, the carriers 30 are cylindrical in form but could be any shape that could fit within the tube segments 20.

Preferably, the carriers 30 have a length similar to that of the tube segments 20, but perhaps slightly shorter and with flexible leads of connectors for the power line 32 and signal line 34 having room to fit between adjacent carriers 30 between adjacent tube segments 20. The carriers 30 are shown having a length similar to (but slightly shorter than) lengths of the tube segments 20. The power line 32 and signal line 34 are shown with slack at their ends to facilitate connecting between adjacent carriers 30 when the tube segments 20 are brought together.

As an alternative, the carriers 30 could have a similar length to that of the tube segments 20 and the carriers 30 would not need to have cables with slack thereon, but could be configured so that the carriers 30 plug directly to each other in a rigid fashion. It is also conceivable that the carriers 30 could be longer than the tube segments 20, such as twice as long, with some carriers 30 spanning joints between adjacent tube segments 20.

The carriers 30 could be configured to allow receiver assemblies 50 to be removably attachable thereto, such as with the carriers 30 configured so that one receiver assembly 50 can be mounted to each carrier 30 adjacent each end of each carrier 30, so that each carrier 30 can carry two receiver assemblies 50. As an alternative, the carriers 30 could be configured to allow more than two receiver assemblies 50 to be attached thereto.

Brackets 36 are preferably provided or other support structures so that the carriers 30 are held securely to the tube segments 20 in a precise position, without allowing the carriers 30 to rotate or translate in any direction or about any axis once installed within a tube segment 20. In this way, the receiver assemblies 50 mounted to the carriers 30 remain oriented in a common orientation and a constant distance away from the transmitter assembly 60. In this simplest form with the brackets 36, the carriers 30 are generally rectangular and planar in form and can slide between the brackets 36 when oriented in one orientation and then after passing past the brackets 36 can be rotated. While space is shown between the carriers 30 and brackets 36, preferably this would be a friction fit between the carriers 30 and brackets 36 so that the brackets 36 would hold the carriers 30 wedged tightly and held in fixed position relative to the tube segments 20.

The transmitter assembly 60 is shown within the transmitter tube 12 without a carrier for the transmitter assembly 60. The transmitter assembly 60 could be on a customized carrier specifically for the transmitter assembly 60, or a carrier similar to the carrier 30 could be utilized to fit within the transmitter tube 12 and carry the transmitter assembly 60 thereon. The transmitter assembly 60 preferably has an appropriate interface for connection of power line 32 and the signal line 34 of the carriers 30 so that the receiver assemblies 50 mounted on the carriers 30 can have access to power and signal as required and in communication with the transmitter assembly 60.

With particular reference to FIGS. 3-5 and 7, details of the carriage 40 are described according to a preferred embodiment. The carriage 40 is preferably flexible to allow for support of wheels 46 or other supports to support the instrument 10 above the ground G. The carriage 40 would most typically be configured to utilize wheels 46.

The carriage 40 includes two portions including a top half 42 and a bottom half 44. These halves 42, 44 are of different sizes, but typically have semi-cylindrical concave recesses therein which define half of a diameter of a tube segment 20 to be sandwiched between the top half 42 and bottom half 44. Lag bolts 45 pass through holes in the top half 42 and into blind bores in the bottom half 44 to secure the top half 42 to the bottom half 44 and with the tube segment 20 of the instrument 10 sandwiched therebetween.

Preferably, the concave recesses in the halves 42, 44 are slightly less than hemi-circular so that a small gap is provided between the two halves 42, 44 and allows for a high degree of tightening through the lag bolts 45 to draw the halves 42, 44 together. In this way, the carriage 40 can be very tightly secured to the tube segments 20. Lock washers or other structural elements can be provided to ensure that the lag bolts 45 do not work their way loose, particularly when the instrument 10 is running over rough surfaces and experiences a variety of different loads and vibrations.

An axle 48 passes through a central portion of the bottom half 44 in a horizontal direction perpendicular to a long axis of the instrument 10. Wheels 46 are attached to ends of the axle 48 in this wheeled embodiment of the carriage 40. Preferably, bearings for the wheels 46 are located within a hub of the wheels 46, so that the axle 48 is stationary relative to the bottom half 44. Alternatively, the axle 48 could be supported in a rotational fashion by the bottom half 44 so that the axle 48 rotates.

Most preferably, the wheels 46 can be removed and other supports attached to the axle 48, or directly to the bottom half 44 to allow the instrument 10 to be borne efficiently over a variety of different ground G surfaces. For instance, sled runners 47 or skis can be provided when terrain is sufficiently rough or soft (e.g. sand) that wheels 46 do not work particularly effectively. The instrument 10 could also be run over water by utilizing pontoons 49 in place of the wheels 46. The pontoons could be rigid or inflatable, and would be sized to displace more water (by weight) than a weight of the instrument, such that buoyancy results.

Typically, in such an arrangement the tow vehicle T (FIGS. 1 and 2) would be replaced with a boat or some other craft (e.g. a hover craft) to carry the instrument 10 over water. If the instrument 10 is to be borne under a helicopter or other floating platform in the atmosphere, the instrument 10 can be fitted with skids to protect the instrument 10 during landing and takeoff and any other inadvertent contact with the ground G.

While the carriage 40 is shown without any particular suspension, various different shock dampening systems and other suspension systems can be provided within the carriage 40 to minimize shock loads to the instrument 10 and to keep the instrument 10 generally steady behind the tow vehicle T, even at relatively high speeds. The instrument 10 is designed to be operational at highway speeds, up to 55 MPH or higher, with the carriage 40 preferably keeping the instrument 10 aligned behind the tow vehicle T when utilized in such a fashion.

In FIG. 5 an embodiment is shown where multiple carriages 40 are attached to the instrument 10', defining an alternative configuration for the instrument 10. When the instrument 10' includes a large number of tube segments 20 attached together, it may be desirable to utilize multiple carriages 40. The hitch 14 could be modified in such embodiments to pivot relative to the transmitter tube 12 about a horizontal axis perpendicular to the long axis of the instrument 10', such as is common with two axle trailers so that the instrument 10' can follow terrain of the ground G when in a multiple carriage 40 configuration.

While FIG. 5 shows an embodiment with four tube segments 20 and one transmitter tube 12, the tube segments 20 and transmitter tube 12 are preferably interchangeable and can be added together in greater or lesser numbers without modifying the tube segments 20. Also, the transmitter tube 12 could be of similar form as the tube segments 20 to facilitate interchangeability between the transmitter tube 12 and the tube segments 20. The radiator 106, defining a portion of the cooling system 100 (FIG. 17) is shown as part of the transmitter tube 12. However, the cooling system 100 could be on its own tube segment 20 or on a tube segment with other equipment besides the transmitter. While the transmitter is shown at a forward end of the platform upon which the instrument 10' is mounted, the transmitter could be at a rear of the instrument 10', or could be in the middle, or multiple different transmitters could be provided at different locations on the platform. Similarly, some of the tube segments 20 could be empty so that they are dummy segments that merely provide spacing. Multiple different receivers, and potentially multiple transmitters can be associated with each tube segment 20. If multiple transmitters are provided, in one embodiment the transmitters could operate at different frequencies simultaneously to add another dimension to the data received by the receivers in other tube segments 20. The platform could also be self-propelled with a prime mover (e.g. a gas engine or electric motor driven system) and steering/control systems for the instrument 10 in vehicle form.

With particular reference to FIGS. 8-16, details of the receiver assemblies 50 and transmitter assembly 60 are described, according to a preferred embodiment. In this preferred embodiment a single transmitter assembly 60 is shown with three receiver assemblies 50 and with each of the receiver assemblies 50 having three mutually perpendicular coil antennas 54, 56, 58. As alternatives, multiple transmitter assemblies 60 could be provided within the instrument 10 and as few as one receiver assembly 50 or more than three receiver assemblies 50 could be utilized. Also, each receiver assembly could have anywhere from one coil antenna 54 (FIGS. 11 and 12) to up to three coil antennas 54, 56, 58 (FIGS. 15 and 16) oriented with mutually perpendicular axes.

In this embodiment shown, the transmitter assembly 60 is shown closest to the hitch 14 within the transmitter tube 12. A central tube segment 20 is provided with two receiver assemblies 50 therein and a trailing tube segment 20 is provided with a single receiver assembly 50 therein and also having the carriage 40 coupled thereto. The transmitter assembly 60 generally includes two parts including the transmitter circuit 62 and a coil antenna 64 to provide the transmitter coil 64. The transmitter coil 64 an be affixed to the transmitter circuit or merely coupled through a wire in the transmitter circuit 62 and the transmitter coil 64.

Typically, the transmitter circuit 62 includes various different electronics components mounted upon a printed circuit board which is generally planar in form. Components on the printed circuit board forming the transmitter circuit would be selected by the designer to generate a transmitter signal and pass that transmitter signal to the transmitter coil 64 as a drive signal to be transmitted and converted into an electromagnetic signal emanating from the transmitter coil 64.

Typically, various different logic devices are also provided which control operation of the instrument 10. Such control logic in the form of a controller or various different forms of programmable logic devices could be included on the transmitter circuit 62 printed circuit board or could be on a separate server that is coupled to the transmitter circuit 62 with appropriate wiring to communicate to the transmitter circuit 62 as required for operation of the system.

Most preferably, a separate server device is associated with the transmitter assembly 60 and functions independently of the transmitter circuit 62, whether this server is physically mounted on a common printed circuit board with the transmitter circuit 62 or mounted on a separate printed circuit board or other platform. Hence, at least conceptually, it is best to consider the transmitter assembly 60 as including a server that is separate from the transmitter circuit 62 and which transmitter circuit 62 receives power either separately or from the server and which receives a signal and operating instructions from the server. This server furthermore communicates with the receiver assemblies 50 as described in detail below, either directly or through the transmitter circuit 62.

The printed circuit board upon which the transmitter circuit 62 is mounted is preferably oriented to be planar but not in a common plane with the transmitter coil 64. The transmitter coil 64 is preferably an elongate oval in form such that a magnetic moment of the transmitter coil 64 can be enhanced over a purely circular transmitter coil fitting within a diameter of the transmitter tube 12. The transmitter coil 64 is driven by a sufficiently high power by the transmitter circuit 62 that the transmitter circuit 62 benefits by being cooled. The transmitter cooling assembly 100 is provided (FIG. 17) for cooling the transmitter circuit 62. A heat sink 102 is provided adjacent the transmitter circuit 62 in direct contact with at least components on the transmitter circuit 62 which tend to generate heat. This heat sink 102 could alternatively be in contact with the entire printed circuit board, but in a manner which prevents the heat sink 102 from interacting in a detrimental fashion conductively with electrical components of the transmitter circuit 62.

This heat sink 102 is preferably a solid mass of high thermal conductivity material, such as copper. Coolant tubes are preferably provided within the heat sink 102 defining the hot path 104 and the cool path 108 for a heat transfer fluid, such as an anti-freeze liquid (e.g. propylene glycol), water or some combination thereof. The hot path 104 passes from the heat sink 102 to a radiator 106 mounted on the transmitter tube 12 and outside of the transmitter tube 12. The cool path 108 returns from the radiator 106 back to the heat sink 102. The hot path 104 and cool path 108 thus form a complete circuit passing from the transmitter circuit 62 to the radiator 106.

The radiator 106 preferably includes fins to further enhance an efficiency of the radiator 106 with those fins oriented to maximize heat transfer as the transmitter tube 12 and associated instrument 10 are passing through the air by being towed by the tow vehicle T. For instance, fins on the radiator 106 can be oriented with a long axis of the instrument 10 residing within the plane of the fins on the radiator 106. In this way, air passing over the instrument 10 can pass between fins of the radiator 106 to avoid hot spots between the fins of the radiator 106 and maximize a temperature differential between the fins of the radiator 106 and surrounding air for most effective heat transfer.

Flow of the heat transfer fluid along the hot path 106 and cool path 108 can be by natural convection or can be induced, such as by including a pump for pumping coolant through the cooling assembly 100. While the cooling assembly 100 is shown in this embodiment, other cooling systems could be utilized including a forced air cooling system utilizing fans blowing on the transmitter circuit 62, or portions of the transmitter circuit 62 could be mounted outside of the transmitter tube 12 to facilitate direct heat transfer to surrounding air. Furthermore, the cooling assembly could be configured as a refrigeration circuit which has a working fluid therein which transitions between different phases in part of its cycle, in a manner akin to that of a refrigeration system. Other cooling systems could also be provided, such as evaporative cooling systems which could utilize water or some other liquid placed on the radiator 106 or other portion of the cooling assembly. The liquid is allowed to volatilize and draw heat of vaporization out of the cooling assembly 100, utilizing the principles of evaporative cooling.

The receiver assemblies 50 are preferably mounted upon the carriers 30 within one of the tube segments 20. The receiver assemblies 50 each include a receiver circuit 52 and at least one coil antenna defining a receiver coil 54. Three subembodiments are illustrated in FIGS. 11-16 for the receiver assemblies 50. In a first embodiment shown in FIGS. 11 and 12, the receiver assembly 50' has a receiver circuit 52 coupled to a single receiver coil antenna 54 oriented about axis A perpendicular to a plane of the receiver circuit 52, which is typically provided on a printed circuit board and includes appropriate electronics mounted thereon for operation of the receiver circuit 52.

In a second embodiment, shown in FIGS. 13 and 14, the receiver assembly 50" includes a receiver circuit 52 and a pair of coil antennas including a receiver coil antenna 54 oriented relative to axis A and a receiver coil antenna 56 oriented about axis B perpendicular to axis A and generally coplanar with a plane of the printed circuit board for the receiver circuit 52.

In a third embodiment (FIGS. 15 and 16) corresponding with the preferred embodiment of this invention (FIG. 8), the receiver assembly 50 includes a receiver circuit 52 and three coil antennas in the form of receiver coil antenna 54, receiver coil antenna 56 and receiver coil antenna 58, oriented about axis A, axis B and axis C, respectively. Each of these coil antennas 54, 56, 58 are oriented mutually perpendicular to each other in this embodiment of FIGS. 15 and 16.

Figure 18:
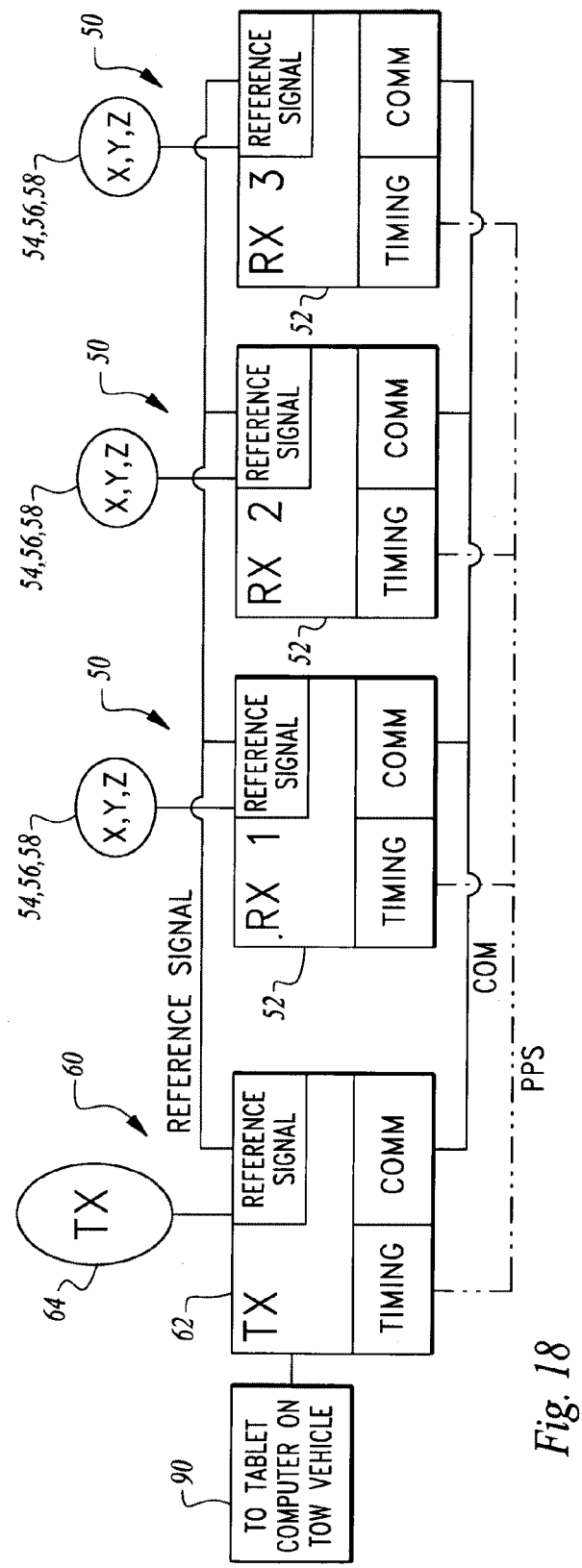
FIG. 18 is a schematic illustrating a client-server relationship between each receiver circuit as a client and the transmitter circuit as a server in operation of the instrument of this invention.

For each of these embodiments for the receiver assemblies 50, a power line 32 and signal line 34 are coupled to the receiver circuit 52 and then the circuit 52 is coupled to the antennas 54, 56, 58 within the receiver assemblies 50. The signal line 34 can include multiple separate conductive pathways or be multiplexed to carry multiple different signals on one or more conductive pathways on the signal line 34. As shown in FIG. 18, the transmitter circuit 62 is shown coupled to the transmitter coil antenna 64 and also with interconnections to the three receiver assemblies 50 of this preferred embodiment. The interconnections between the transmitter assembly 60 and the receiver assemblies 50 do not show the power connection, but rather only the signal connections. In this representation of the invention, the transmitter is shown communicating at least three separate signals to each of the receivers. First, a reference signal is routed to each of the receivers. This reference signal is similar to the driver signal that is driving the transmitter coil antenna 64. By routing a reference signal to each of the receiver assemblies 50, each receiver circuit 52 can utilize one or more of the coil antennas 54, 56, 58 to sense an electromagnetic signal responsive to the transmitter signal and then compare it to the reference signal. In such comparison, a phase shift in the signal from the transmitter coil antenna 64 can be sensed.

The signal line 34 can carry, in addition to this reference signal, a communication signal between the transmitter assembly 60 and the receiver assemblies 50. This communication signal can communicate a variety of control signals between the transmitter assembly 60 and the receiver assemblies 50 to control operation of the receiver assemblies 50. An additional line of the signal line 34 can pass a timing signal from the transmitter assembly 60 to each of the receiver assemblies 50. This timing signal can be utilized to mark each data point received by the receiver assembly 50 with a time stamp.

This time stamp acts as a temporal tag for the data received by the receiver assemblies 50. This time information allows each data point to be handled as a separate packet of data and can be transmitted in a variety of different sequences to the transmitter assembly 60, such as along the comm line of the signal line 34. Even though the data may arrive out of sequence, the data packets can be sorted sequentially so that they can be organized by time.

Preferably, a GPS ("Global Positioning System") antenna 72 and GPS unit 74 are sensing and recording position information and simultaneously also tagging that position information with time. Preferably, the same clock that is tagging the GPS position data is also used to tag the data points sensed by the receiver assemblies 50. By comparison of the time of the GPS data with the time of the receiver assembly 50 sensed data, each data point sensed by the receivers 50 can be additionally tagged with position information from the GPS unit 74. Thus, the data sensed by the receiver assemblies 50 can be placed within a geographical frame of reference. Typically, this geographical frame of reference is a terrestrial coordinate system (e.g. latitude and longitude numbers).

Other position location systems could be utilized in place of the GPS antenna 72 and GPS unit 74. For instance, the instrument 10 could include or be coordinated with an absolute encoder system which keeps track of accelerations experienced by the instrument 10 so that movement of the instrument 10 can be tracked and calculations made as to the current position of the instrument 10 at any given time. Such position information from an absolute encoder could be tagged with time and later matched with data having the same time signature. Alternatively, such position information could be tagged directly to the data as the data is gathered.

Other systems for tagging the data with position information could include a wheel counter counting a number of revolutions of wheels on the carriage 40. Such a wheel counter would keep track of the number of turns of the wheel and know the diameter of the wheel so that position information could be calculated. Such position information could be time stamped and then position information having the same time stamp as sensed signal data by the receiver assemblies 50 could be matched together. Alternatively, position information from such wheel sensors could be matched directly with the data from the receivers 50. Similarly, systems analogous to GPS systems but not involving satellites, but rather other positioning devices separate from the instrument 10, but communicating with the instrument 10, could be utilized to provide such position information.

While FIG. 18 shows the transmitter assembly 60 communicating with the receiver assemblies 50, such communication is in the context of the transmitter assembly 60 including a server controller as part of the circuit 62 of the transmitter assembly 60. This server could be separate from the transmitter assembly 60 and be coupled to the transmitter assembly 60 to control the transmitter assembly 60. For convenience, this server function can be formed on a common printed circuit board with the transmitter assembly 60 and otherwise be integrated with the transmitter assembly 60, and is discussed in this way in the above description of the details of FIG. 18.

It can be seen that this arrangement is such that each of the receiver assemblies 50 acts as a client within a server-client relationship. The instrument 10 is flexibly configured so that a single server, either separate from the transmitter assembly 60 or associated with the transmitter assembly 60 can communicate with one or more separate clients, such as in the form of receiver assemblies 50. The GPS unit 74 and associated antenna 72 can also be considered as a separate client of this server. Any other additional receiver assemblies 50 or additional transmitter assemblies 60 could be additional clients communicating with the server. Additionally, other sensors could act as additional clients communicating with the server along a common communication system. For instance, a soil conductivity sensor could be provided as a client to assist in calibration of the instrument 10. Also, the graphical user interface 90 and the associated operator on the tow-vehicle T can be coupled to the server in the form of a client with information being exchanged between the server and the graphical user interface 90 on the tow vehicle T.

The instrument 10 is beneficially configured so that it has a sampling rate to facilitate rapid gathering of data over a large area with the tow vehicle T traveling at high speeds. In a preferred embodiment, the sampling rate is 156.25 samples per second. At such a sampling rate, the tow vehicle T can be pulling the instrument 10 at highway speeds (e.g. 55 MPH) and gather data points which are less than one foot from each other. This sampling rate allows for processing of data to occur with integer math rather than floating point math, so that processor power is most efficiently utilized.

Typically, the GPS unit 74 cannot gather position data at a rate of 156.25 samples per second. To allow the data gathered at this high sampling rate to have individual data points for position, the GPS unit 74 is operated at a relatively high rate, such as twenty samples per second. Linear interpolation is then utilized between consecutive GPS unit 74 position data points and receiver assembly 50 data. So long as the instrument 10 is not undergoing a rapid state of acceleration or deceleration, these "pseudo-position" points constructed mathematically by linear interpretation between actual position data points gathered by the GPS unit 74 provide a very close approximation to the actual positions for each data point. Such a methodology allows for a high sampling rate and rapid data collection even exceeding the rate of sampling of the GPS unit 74, while still providing accurate position data for the data gathered by the receivers 50.

Figure 19:
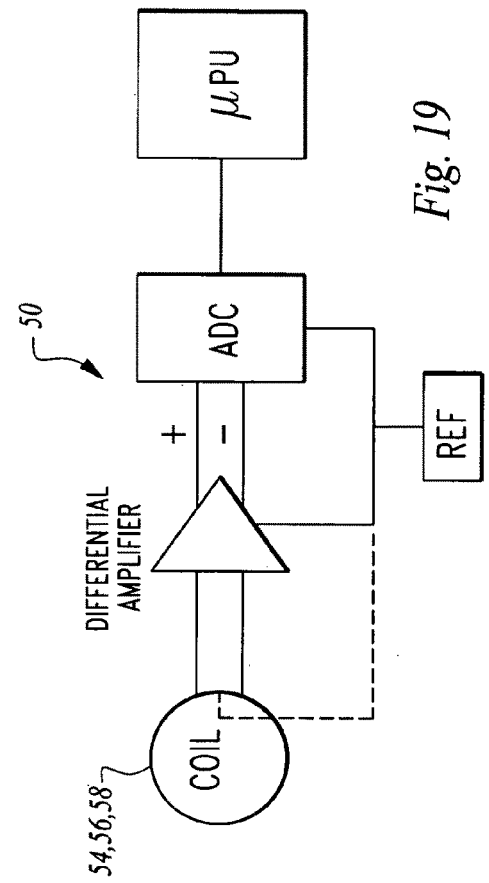
FIG. 19 is a schematic of a typical receiver circuit generalized to show components for amplifying the differential signal sensed by the receiver.

With particular reference to FIG. 19, further details of the receiver circuit 52 and receiver assemblies 50 are represented schematically according to a preferred embodiment of this invention. This schematic indicates conceptually how the coil antennas 52, 54, 56 (labeled as "COIL") are coupled to at least one analog-to-digital converter (labeled as "ADC") and to at least one microprocessor unit (labeled as "μPU"). Each coil antenna 54, 56, 58 can include its own analog to digital converter and its own microprocessor unit, or a single microprocessor unit can work with three different analog-to-digital converters associated with each of the coil antennas 54, 56, 58, or a single analog-to-digital converter and a single microprocessor unit can work with each of the three coil antennas 54, 56, 58.

Importantly, the coil antennas 54, 56, 58 are wound to have two leads extending therefrom (details of the coil winding are provided below). Rather than coupling one lead from the coil antenna to ground and sampling the other lead, each of the leads are routed to a differential amplifier. This differential amplifier amplifies the differential signal between leads at ends of the coil. The differential amplifier outputs a differential signal that is then routed to the analog-to-digital converter. A reference voltage is provided for both the analog-to-digital converter and the amplifier in accordance with well known microelectronic circuit design techniques. Furthermore, other signal conditioning as is known in the art would typically be added to this circuit to optimize its performance.

As an option, the reference voltage can also be coupled to a midpoint on the coil. Such an optional midpoint connection between the reference and the coil is indicated in broken lines in FIG. 19.

By using the coil antennas 54, 56, 58 in a manner sensing a differential signal off leads at ends of the coil antennas 54, 56, 58, common mode noise-that is picked up by both "ends" of the coil cancel each other out. Hence, a natural filter of a large portion of noise is naturally filtered out before the differential signal is routed to the amplifier. Such a configuration makes possible a high dynamic range and high sensitivity for the instrument 10. This sensitivity and high dynamic range are further implemented by configuring the analog to digital converter to be a twenty-four bit device so that a large number of relevant data points can be gathered by the receiver assemblies 50 with a minimum of noise contained within the signal. Such a benefit could be provided, although to a lesser extent, with a sixteen bit analog-to-digital converter or other analogous data transfer hardware and techniques.

With particular reference to FIGS. 21-23, details of the configuration of the coils 54, 56, 58 of the receiver assemblies 50 are described. These details are also provided for the transmitter coil antenna 64, except that the transmitter coil antenna 64 is preferably oval in form rather than circular, and as otherwise distinguished herein. Each coil antenna 110 (FIGS. 21-23) includes a series of turns of wire mounted upon a bobbin 120 which supports the wires precisely where desired. To maximize the magnetic dipole moment of the coil 110, while still being able to fit within the tube segments 20 and minimize self-capacitance of the coil 110, the bobbin 120 has a divider 122 which extends circumferentially at a central plane CP midpoint of the rim 125 of the bobbin 120.

Furthermore, beneficially a series of additional dividers 124 are provided extending radially away from the central axis CA and circumferentially about the rim 125 of the bobbin 120. While FIGS. 21 and 22 show twelve slots between dividers 122, 124 and the rim edges 126, and all dividers 122, 124 of similar width, most preferably only ten slots are provided. The slots are preferably of common width, except the slots/grooves adjacent the edges 126 are preferably wider (e.g. fifty to one hundred percent wider). The central divider 122 is preferably wider than the other dividers 124, such as two to three times wider. The transmitter coil 64 would typically not have such additional dividers, but could also have such dividers.

The wires are preferably passed onto the coil 110 adjacent the divider 122 at the center of the rim 125. The wire is then wound circumferentially about the rim 125 of the bobbin 120. Most preferably, twenty turns are provided for each slot between adjacent dividers 124. The winding segments then transition to the next slot for twenty more turns. Typically, the twenty turns per slot will stack approximately five wide and four deep. Each wire segment WS1, WS2 extends from the central divider 122 to the rim edge 126 and then terminating at a lead. The start points are joined together on the central divider, but wrap in opposite directions. The end points of the wires opposite the starting points define the two leads of the coil 110 which are coupled to the receiver circuit 52 for processing of the signal sensed by the coil 110 (FIG. 19). Notches are formed in the dividers 124 to facilitate transition of the wires between pockets located between the dividers 124.

The transmitter coil 64 differs in that preferably the wire turns do not stack up as the winding progresses. Also, the transmitter coil 64 preferably is configured to have a geometry, self-capacitance and other characteristics that keep a self-resonant frequency of the coil 64 form being the same or too close to the operating frequency of the signal driving the transmitter coil 64. The transmitter coil 64 most preferably has a sensing coil to monitor transmitter coil 64 output, both for fault detection, performance monitoring and to aid in calibration of data received by the receivers. This sensing coil is typically two turns of co-axial cable with one turn on either side of the central divider and with a center tap as well as end taps to draw sensing coil signals for the transmitter coil 64. Where the sensing coil crosses the central divider a notch can be provided in the central divider. The sensing coil can cross the divider with a 180° turn or continuing in the same sensing coil winding direction.

When the outer edge of the rim of the transmitter bobbin is reached by the wire, the wire turns back and forms a second layer of turns as it is wound back to the central divider 122 again. The wire is similarly wrapped on each side of the divider, starting near the divider 122, wrapping away from the divider 122 to the edge 126 opposite the divider 122 and then stacking on top of the first set of windings to form a second layer of windings back to the divider 122. The starting points for each of the wires are preferably coupled together over the divider 122 or through a notch in the divider 122.

Preferably, the wire wrapped around the bobbin 120 forms a mirror image on either side of the central divider 122 of the bobbin 120 for both the receiver and transmitter coils. Thus, if viewed from one end, the wire might be wrapped clockwise until it reaches the central divider 122 and then transitions to being wrapped counterclockwise as it continues to the opposite end. Because the direction of wrapping of the wire changes in this way, and with a common number of turns on either side of the divider 122, the coil 110 does not itself generate any magnetic field. Rather, the magnetic field formed by each portion of the coil 110 cancel each other out. Such a configuration could also be provided by the transmitter coil antenna 64, or the transmitter coil antenna 64 could be configured so that, the magnetic fields generated thereby would be additive rather than canceling each other out. When configured this way, the transmitter coil can have a large magnetic dipole moment of at least one amp meter squared, and potentially ten or more than ten amp meters squared.

Both the carriers 30 for the receiver assemblies 50 and any carrier for the transmitter assembly 60 and the tube segments 20, as well as the transmitter tube 12 are preferably formed of non-metallic materials to minimize electromagnetic interference with the instrument 10. For instance, the transmitter tube 12 and tube segments 20, as well as the carriers 30 can all be formed of plastic or fiberglass. Such materials also beneficially minimize a weight of the instrument 10 to further enhance portability and assembly, and allowing various different components to be assembled by hand in the field by one individual or a small team of personnel.

The carriage 40 is also preferably formed of non-metallic materials, such as with the halves 42, 44 formed of wood and with the axle 48 formed of carbon fiber tubing or reinforced fiberglass tubing, or high strength plastic. Rims of the wheels 46 are preferably also formed of wood or fiberglass or plastic to minimize such interference. The tines and wheels 46 are typically formed of rubber or plastic and can be solid, rather than pneumatic to minimize the need for a valve fitting or other component that would typically be formed of metal. Furthermore, bolts which connect tube segments 20 and the carriage 40 are preferably formed of non-metallic materials, such as fiberglass, carbon fiber or high strength plastic.

Figure 20:
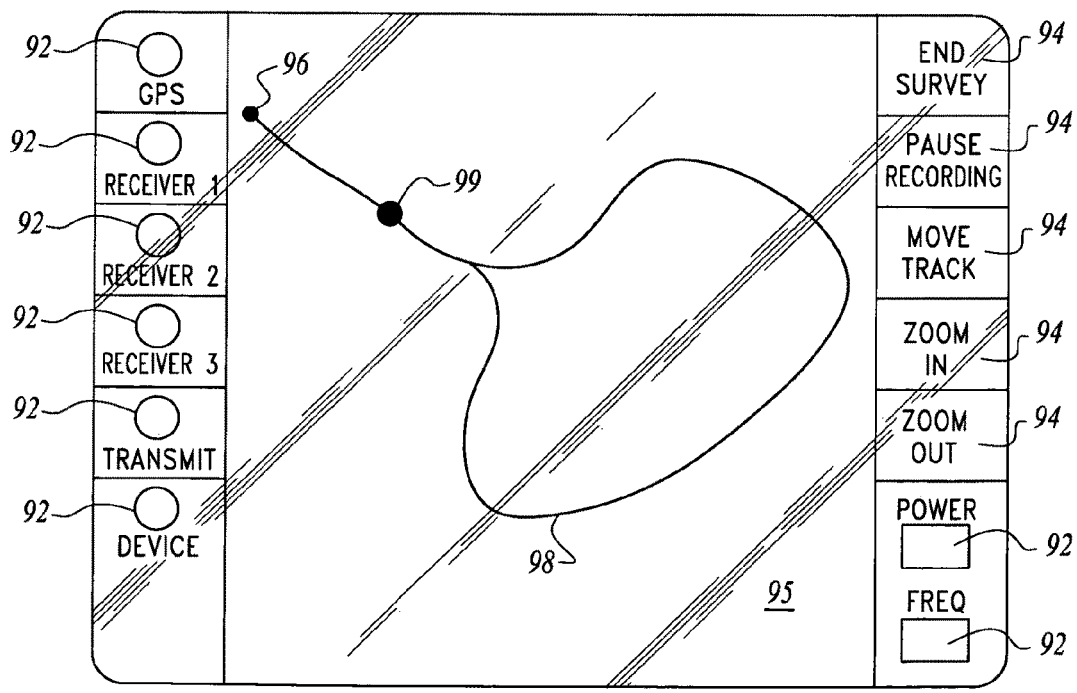
FIG. 20 is a front elevation view of a graphical user interface provided to a tow vehicle operator towing the instrument of this invention in use.

With particular reference to FIG. 20, further details of the operation of the instrument 10 are described, as well as a graphical user interface 90 for the instrument 10. In the preferred embodiment shown herein, the instrument 10 is being deployed over ground G by relatively low skill personnel capable of effectively driving a motor vehicle such as the tow vehicle T. The operator is with the instrument 10 and the tow vehicle T at the site where a survey is to be taken. Typically, an analysis location is also provided, typically referred to as a base. At this base, communication can take place and personnel skilled in analyzing data provided by the instrument 10 can remain. At this location analysis can occur. A satellite can provide communications between the instrument and operator in the field and the base where analysis is taking place, or other forms of communication could be utilized, such as cellular telephone communication, wireless radio telecommunication, or any other communication method.

The operator interacts with the instrument 10 through the operator graphical user interface 90 (FIG. 20). An analyst can also communicate with the operator even though the analyst might not be with the tow vehicle T (but the analyst could be with the operator at the tow vehicle T also). A master controller is provided which acts as a server to control the transmitter assembly 60 and receiver assembly 50 of the instrument 10. A data logger is also preferably provided as a client of the server to collect and store data gathered by the instrument 10. The receiver circuit 52 and transmitter circuit 62 act as clients to the server of the master controller data logger. This master controller data logger can be located in the transmitter tube 12 along with the transmitter assembly 60 or can be located on the tow vehicle T.

The graphical user interface 90 with the operator typically does not include the data other than position data that the instrument 10 has traveled. Thus, more sensitive information gathered by the instrument 10 can be effectively kept sequestered to individuals who have a need to have access to this information. Encryption of such data can occur if required to enhance security of the data further.

The GPS unit 74 including a GPS antenna 72 defines primary portions of an overall GPS system. This GPS satellite data is utilized to mark individual data points provided by the receiver during the operation of the instrument 10. While this position data can be tagged to the data from each receiver, and most preferably each antenna of each receiver if the receiver assembly 50 includes multiple antennas 54, 56, 58, most preferably the tagging of this data occurs in two steps. First, the server includes a clock and sends out a clock signal to the receiver circuits 52. The receiver circuits 52 receive a receiver signal through the receiver antennas 54, 56, 58 responsive to the transmitter assembly 60, and representative of details gleaned from beneath the ground G.

Each item of data received by the receiver assemblies 50 is typically a magnitude in the form of a phase shift relative to a phase of a transmitter signal driving the transmitter coil antenna 64. The magnitude of the data received by the receiver assemblies 50 is thus a measure of this phase shift. This magnitude number could conceivably be either a positive or a negative number depending on whether this phase shift is in a first direction or in a second direction opposite the first direction. The data from the receiver assemblies are tagged with time provided from the server. Thus, each data point includes a magnitude dimension and a time dimension. This data is then passed to the master controller data logger server. Simultaneously, the master controller data logger server is communicating with the GPS satellite and creating a data set that combines GPS position information with time information.

The processor can then combine these two files so that each magnitude data point received from the receiver assembly 50 can have its time dimension matched with position information from the GPS system. This magnitude information can then be effectively plotted with position coordinates to generate a map of phase shift magnitude. Such a plot defines one form of useful output to the analyst at the base location.

The system is operated by the operator through the graphical user interface 90 (FIG. 20). This graphical user interface includes an area view 95 which is typically a top plan view of a region surrounding where the instrument 10 is located. Details in this view 95 can be in the form of commercially available electronic maps calibrated to specific position coordinates. Such details could be provided both in the graphical user interface 90 and with data delivered to the analyst, at the base location or with the tow vehicle T. A dot or other icon is typically provided that defines current position 99. Another dot (or other icon) is typically provided which defines a start dot 96 when a survey began. A path traveled line 98 is provided which follows a path that has been traveled by the instrument 10 and generally connects the start dot 96 to the current position dot 99.

The graphical user interface 90 includes status buttons 92 and control buttons 94 preferably on a touch screen for utilization by the operator. The status buttons 92 could have a variety of different configurations. In a simplest configuration these buttons are not selected by the operator but merely provide status for various different components of the instrument 10. For instance, circles can be provided with wording underneath the circle and if the circle is red there is a problem with that component of the instrument 10 and if the circle is green, that portion of the instrument 10 is operating properly. Such status buttons 92 thus function as "idiot lights" similar to that on an automobile.

Other buttons can be in the form of control buttons 94 which can allow the operator to have some control of the graphical user interface 90 and/or the instrument. For instance, in an upper right corner a button can be provided which says "start survey" if a survey is not currently in progress and which says "end survey" if a survey is currently in progress. When this button is pushed, the system is turned on and off. As an alternative, an analyst at the base location could control turning on and off of the instrument rather than the operator.

A second control button 94 can allow for pausing of recording of data. This would allow the operator to drive the tow vehicle T from a location where data is to be gathered, past an area where no data is required, and to a new area where more data needs to be again acquired. A next button entitled "move track" can be in the form of a series of arrow buttons which would appear over the area view 95 after pushing this button on the screen. These arrow buttons could be pushed to move the view north, south, east, west or in other directions, including an opportunity to rotate the screen if desired. Also, control buttons 94 can be provided to zoom in and out on the area view 95.

In a lower right corner status buttons 92 are provided which identify a current power of the instrument and a current frequency of the instrument. These buttons could be configured as control buttons so that when they are pushed they toggle through different powers or frequencies for operation of the instrument. In other embodiments the power of the instrument can automatically adjust or be adjusted by an analyst in another location or be adjusted in power through some other control system in the graphical user interface 90. Similarly, frequencies can be so adjusted.

Once the data has been gathered, it can be manipulated and interpreted in a variety of different ways as determined by a skilled data analyst. When multiple receivers are provided at different distances from the transmitter, typically the receiver most distant from the transmitter receives data correlating most completely with deeper structural details beneath a surface of the ground G. For appropriate matching of signals received from the different receivers at different distances from the transmitter, depth information can be provided for the instrument as well as coordinates for the surface of the ground G. Similarly, different receiver antennas having different orientations relative to the transmitter antenna receive unique data which might correlate more particularly with artifacts and other structures or voids beneath the surface at varying depths. Through calibration and experience in utilizing the instrument, a skilled analyst can better mine the data set gathered by the receiver assemblies 50 and program display devices to visually present the data to provide meaningful information to the analyst about structures contained beneath a surface of the ground G.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. For instance, while the instrument has been described herein primarily as a frequency domain instrument, it could be configured as a time domain instrument. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A low noise high sensitivity instrument for sensing details of a subterranean space, the instrument comprising in combination:

at least one transmitter;

said transmitter including at least one transmitter coil antenna adapted to emit a transmitter electromagnetic signal;

at least one receiver;

said receiver including at least one receiver coil antenna;

said receiver coil antenna adapted to receive an electromagnetic receiver signal responsive to said transmitter electromagnetic signal;

said at least one receiver coil antenna having two wire winding segments divided by a central plane perpendicular to a central axis of said receiver coil, said two wire segments wrapped in opposite directions and coupled together across said central plane with ends of said wire winding segments opposite said central plane defining opposite leads of said receiver coil antenna, said opposite leads sensed by said receiver to measure a difference in signals sensed by said opposite leads;

wherein said opposite leads are coupled to differential inputs of a differential amplifier, said differential amplifier adapted to amplify a difference between said opposite leads; and wherein a circuit including said differential amplifier therein includes a reference voltage coupled to both said differential amplifier and to a portion of said receiver coil between said two wire winding segments, such that a reference voltage for said amplifier corresponds with a voltage at a midpoint of said coil between said two wire winding segments.

2. The low noise high sensitivity instrument of claim 1 wherein a central divider of low conductivity is oriented within said central plane, said central divider separating said two wire winding segments from each other.

3. The low noise high sensitivity instrument of claim 1 wherein said differential amplifier includes differential outputs, said differential outputs coupled to two separate inputs of an analog-to-digital converter, said analog-to-digital converter adapted to convert a signal representative of a difference between said two outputs of said differential amplifier into a digital signal.

4. The low noise high sensitivity instrument of claim 3 wherein said analog-to-digital converter is a twenty-four bit analog-to-digital converter.

5. The low noise high sensitivity instrument of claim 1 wherein said transmitter coil antenna has a magnetic dipole moment of at least one amp meter squared.

6. A low noise high sensitivity instrument for sensing details of a subterranean space, the instrument comprising in combination:
   at least one transmitter;
   said transmitter including at least one transmitter coil antenna adapted to emit a transmitter electromagnetic signal;
   at least one receiver;
   said receiver including at least one receiver coil antenna;
   said receiver coil antenna adapted to receive an electromagnetic receiver signal responsive to said transmitter electromagnetic signal;
   said at least one receiver coil antenna having two wire winding segments divided by a central divider perpendicular to a central axis of said receiver coil, said two wire segments wrapped in opposite directions and coupled together across said central divider with ends of said wire winding segments opposite said central divider defining opposite leads of said receiver coil antenna, said opposite leads sensed by said receiver to measure a difference in signals sensed by said opposite leads;
   wherein said opposite leads are coupled to differential inputs of a differential amplifier, said differential amplifier adapted to amplify a difference between said opposite leads; and
   wherein a circuit including said differential amplifier therein includes a reference voltage coupled to both said differential amplifier and to a portion of said receiver coil between said two wire winding segments, such that a reference voltage for said amplifier corresponds with a voltage at a midpoint of said coil between said two wire winding segments.

7. The instrument of claim 6 wherein said central divider is of low conductivity.

8. The instrument of claim 6 wherein said central divider is oriented within a central plane perpendicular to said central axis, said central divider separating said two wire winding segments from each other.

9. The instrument of claim 6 wherein said differential amplifier includes differential outputs, said differential outputs coupled to two separate inputs of an analog-to-digital converter, said analog-to-digital converter adapted to convert a signal representative of a difference between said two outputs of said differential amplifier into a digital signal.

10. The instrument of claim 9 wherein said analog-to-digital converter is a twenty-four bit analog-to-digital converter.

11. The instrument of claim 6 wherein a plurality of additional dividers oriented in planes parallel with said central divider divide each of said wire winding segments into separate parallel slots.

12. The instrument of claim 11 wherein said central divider is wider than said plurality of additional dividers.

13. The instrument of claim 6 wherein said at least one receiver includes a plurality of receiver coil antennas oriented distinctly relative to each other.

14. The instrument of claim 13 wherein said plurality of receiver coil antennas includes three receiver coil antennas oriented with central axes thereof substantially mutually perpendicular to each other.

15. A low noise high sensitivity instrument for sensing details of a subterranean space, the instrument comprising in combination:
   at least one transmitter;
   said transmitter including at least one transmitter coil antenna adapted to emit a transmitter electromagnetic signal;
   at least one receiver, said receiver located a substantially fixed distance from said at least one transmitter;
   said receiver including at least one receiver coil antenna;
   said receiver coil antenna adapted to receive an electromagnetic receiver signal responsive to said transmitter electromagnetic signal;
   said at least one receiver coil antenna having two wire winding segments divided by a central plane perpendicular to a central axis of said receiver coil, said two wire segments wrapped in opposite directions and coupled together across said central plane with ends of said wire winding segments opposite said central plane defining opposite leads of said receiver coil antenna, said opposite leads sensed by said receiver to measure a difference in signals sensed by said opposite leads;
   wherein said opposite leads are coupled to differential inputs of a differential amplifier, said differential amplifier adapted to amplify a difference between said opposite leads; and
   wherein a circuit including said differential amplifier therein includes a reference voltage coupled to both said differential amplifier and to a portion of said receiver coil between said two wire winding segments, such that a reference voltage for said amplifier corresponds with a voltage at a midpoint of said coil between said two wire winding segments.

16. The instrument of claim 15 wherein said at least one transmitter and said at least one receiver are carried upon a common support structure.

17. The instrument of claim 16 wherein said support structure is mobile.

18. The instrument of claim 15 wherein a central divider of low conductivity is oriented within said central plane, said central divider separating said two wire winding segments from each other.

19. The instrument of claim 15 wherein said differential amplifier includes differential outputs, said differential outputs coupled to two separate inputs of an analog-to-digital converter, said analog-to-digital converter adapted to convert a signal representative of a difference between said two outputs of said differential amplifier into a digital signal.

20. The instrument of claim 19 wherein said analog-to-digital converter is a twenty-four bit analog-to-digital converter.

21. The instrument of claim 15 wherein said transmitter coil antenna has a magnetic dipole moment of at least one amp meter squared.

* * * * *